Patented Nov. 7, 1950

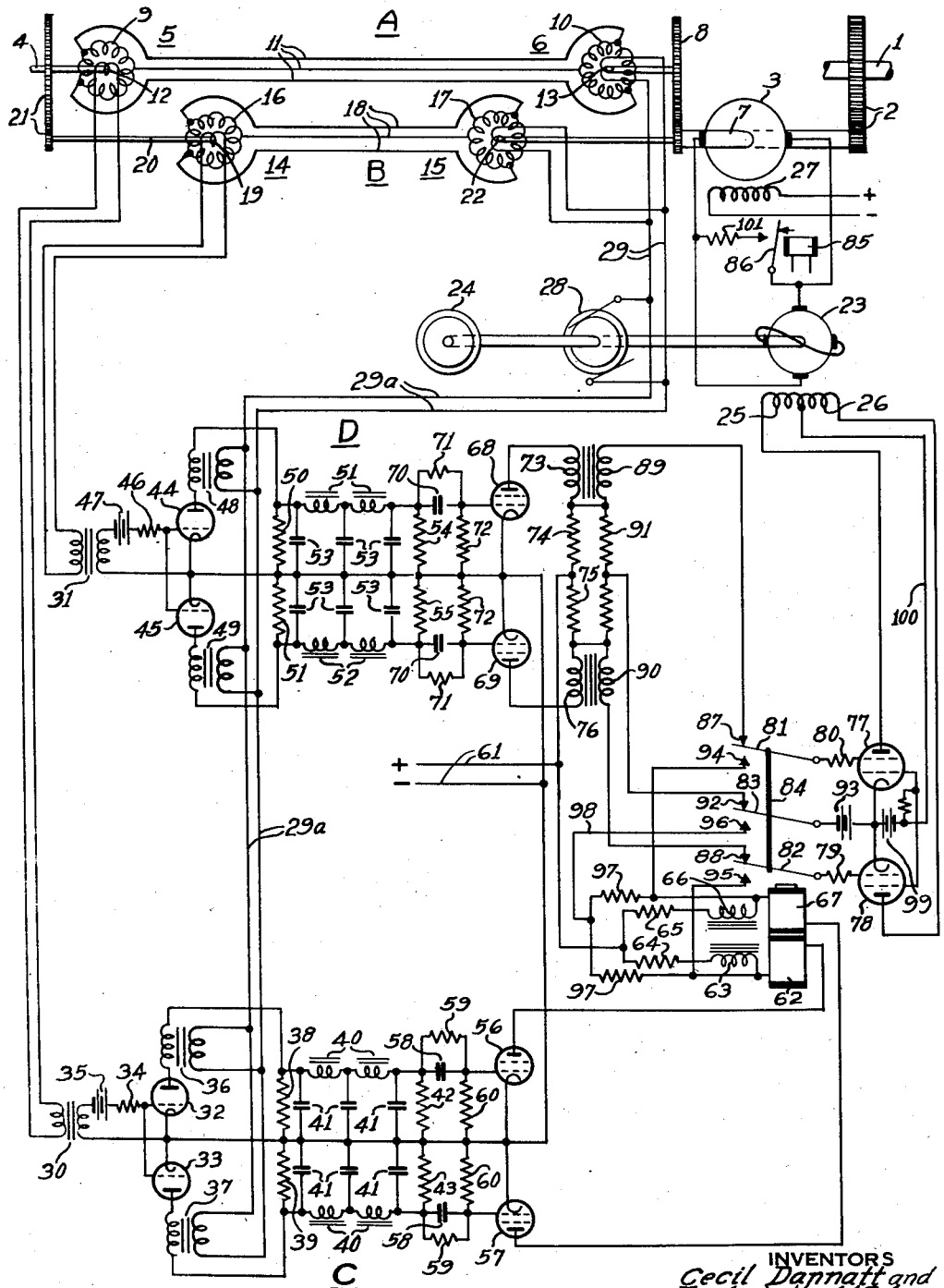

2,528,486

UNITED STATES PATENT OFFICE 2,528,486

ELECTRIC FOLLOW-UP CONTROL SYSTEM

Cecil Dannatt, Hale, and Frederick Harold Belsey, Stretford, Manchester, England, assignors to Metropolitan-Vickers Electrical Company Limited, London, England, a British company, and Vickers-Armstrong Limited, London, England, a British company Application August 11, 1945, Serial No. 610,356
In Great Britain July 31, 1939

Section 1, Public Law 690, August 8, 1946
Patent expires July 31, 1959

4 Claims. (Cl. 318—30)

This invention relates to follow-up control systems for load devices, for example guns, gun turrets, rudders, fluid valves and other movably mounted objects which are adapted to be moved by suitable motive equipments the torques of which are controlled by means of the follow-up system so that by the manually or otherwise produced movements to predetermined positions of control members such as director gear for example said load devices are caused to follow the movements of and to be set in final positions corresponding to those of said control members.

The invention has for its object to provide an improved follow-up system which is simple and reliable and which in particular will ensure that the load device shall quickly follow the control member and assume, without impermissible "hunting" or self-sustained oscillation, its final position in accurate correspondence with said control member.

Various arrangements and systems have already been proposed to obtain the above results but these prior proposals have suffered from one defect or another so that it has been so far impossible to obtain accuracy corresponding to small fractions of 1° angle. Such known arrangements have in various degrees caused the motive equipment constantly to drive the load towards the required alignment and constantly to correct any tendency to misalignment. So far as the present applicants are aware none of these prior proposals has succeeded in producing in a reliable and robust apparatus the degree of accuracy required at the present time and which is obtainable with the system according to the invention.

According to the present invention a follow-up control system comprises the combination with selsyn devices coupled with the control member and the load device and arranged to produce a voltage representative of the displacement of said load device with respect to said control member and a hard valve amplifying system for amplifying said voltage, with reactive means interposed between said selsyns and an output circuit of said hard valve amplifying system so as to produce in said circuit a current dependent on the rate of change of said voltage, of electromagnetic means connected with said amplifying system so as to be energised by the output of the latter, which means govern the torque imparted to the load device by the motive means therefor in accordance with the energisation of said means, whereby said torque depends on said voltage and there is added to said torque a component which is dependent on the rate of change of said voltage and therefore of the displacement and which acts in opposition to the velocity of movement of the load device relative to the control member.

The electromagnetic means referred to may comprise an exciting winding of a dynamo electric machine arrangement having connected in the output circuit thereof a field or armature winding of an electric motor forming the driving motor equipment so as to control the torque of said motor in accordance with the operation of the follow-up system. In a preferred arrangement of this kind said electromagnetic means comprises a variator winding of a metadyne machine and, according to another aspect, the invention thus provides a follow-up control system comprising the combination with selsyn devices coupled with the control member and the load device and arranged to produce a voltage representative of the displacement of said load device with respect to said control member and a hard valve amplifying system for amplifying said voltage with reactive means interposed between said selsyns and an output circuit of said hard valve amplifying system so as to produce in said circuit a current dependent on the rate of change of said voltage, of a metadyne machine having variator winding turns connected with said amplifying system so as to be energised by the output of the latter and having secondary brushes connected with a winding of an electric motor for driving the load device or with an exciter for said winding, whereby the torque imparted to the load device by said motor depends on said voltage and there is added to said torque a component which is dependent on the rate of change of said voltage and therefore of the displacement and which acts in opposition to the velocity of movement of the load device relative to the control member.

Selsyns are inductive devices having relatively movable stators and rotors with respective alternating current windings and arranged so that when a suitable alternating voltage is applied to one of said windings an alternating voltage will be induced in the other of said windings and relative angular movement between the stator and rotor will vary said induced voltage in phase and/or magnitude with respect to the voltage applied to said first winding. Devices of this kind as employed for follow-up control systems are well known under the name of "selsyns," and for convenience the term "selsyn" is employed herein and in the appended claims to denote generally inductive devices of the kind just above defined.

It is known that follow-up control systems in which the torque of the motive means for driving the load device is controlled only in accordance with the displacement of the load device with respect to the control member will be insufficient to obtain the required freedom from hunting of the load device about its position of alignment with the control member, that is to say the position of zero displacement, and that by the introduction into the torque of a component dependent upon the rate of change of the displacement and acting so as to oppose the velocity of movement of the load device with respect to the control member, this tendency to hunt can be overcome. The follow-up control system according to the invention may be arranged to act upon the torque of the motive means for driving the load or may act directly upon the velocity of the load as with the variable velocity ratio transmission as hereinbefore set forth, and in the latter case the addition to the component of velocity control dependent upon the displacement of a component dependent upon the rate of change of displacement will again prevent impermissible hunting by causing corresponding control of the torque in calling for change in the velocity of the load device. It is necessary in order that the hunting shall be prevented that the torque imparted to the load shall respond quickly and accurately in the required manner to the sum of the two components above mentioned and in the arrangement according to the invention such quick and accurate response is obtained due to the use of an amplifying system comprising hard valves by which the control quantity derived from the selsyns is applied to control said torque. The hard valves, however, are not required to handle the power supplied for moving the load device, the electromagnetic means being provided for obtaining further power amplification whereby the follow-up control system as a whole is reliable and robust whilst providing the required operation and being adapted to control load devices of large mass.

In carrying out the invention the reactive means referred to may conveniently comprise a choke coil included in the anode circuit of hard valve means by which the voltage from the selsyns is rectified or by which said voltage is amplified after rectification by hard valve means. Alternatively in place of a choke coil as just above indicated a transformer may be employed having its primary winding included in an anode circuit as just above referred to and its secondary winding included in the grid circuit of a subsequent stage of hard valve amplifying means.

Preferably the selsyn system is of the known kind comprising two selsyns coupled respectively with the control member and the load device, which selsyns are arranged in accordance with a known system with polyphase and single-phase windings respectively on their stators and rotors or vice versa for one or both of the selsyns, the polyphase windings of the two selsyns being interconnected with one another whilst the single-phase winding of one selsyn is arranged to be energised from a source of alternating current and a single-phase winding of the other selsyn is connected with the grid circuit of a hard valve rectifying and amplifying combination which is responsive to the magnitude of the voltage of said second single-phase winding and of the phase of said voltage with respect to the voltage of said source of alternating current. Conveniently for this purpose the single-phase winding of said second selsyn is connected with the grids of two rectifying triodes so that the voltage from said winding is applied in parallel to said grid whilst the anode circuits of said triodes are arranged to be energised from the source of single-phase alternating current applied to the first single-phase winding of a source in phase therewith. By this means the conduction of one or the other of the triodes will predominate at any time in accordance with the direction of the displacement of the load device from the control member. It will be understood that the selsyn system referred to above although the preferred form for carrying out the present invention, is referred to by way of example only since other selsyn systems are suitable for adoption in the follow-up control system according to the invention.

In order that the invention may be clearly understood and readily carried into effect, reference will now be made by way of example to the accompanying drawing the single figure of which is an electrical diagram of a preferred embodiment of the follow-up control system according to the invention and shows also the main power circuit of an electric motor equipment for moving the load device under control of the follow-up control system.

In the drawing, the load shaft with which the gun or other load device (not shown) is connected is indicated at 1, this shaft being connected through gearing 2, which is preferably fully reversible, with the armature 3 of an electric motor for moving the load device. A control member in the form of a shaft 4 is provided, with which shaft the shaft 1 is required to be maintained in alignment. For example, where the load device comprises a gun the control shaft 4 will be coupled with the director gear. Between the control shaft 4 and the load shaft 1, there are arranged two selsyn systems A and B which, as will hereinafter be explained, are respectively operative for bringing the shaft 1 into approximate and final alignment with the shaft 4.

The selsyn system A comprises selsyn device 5 and 6 of which the device 5 has its rotor connected with the shaft 4 and the device 6 has its rotor connected with the shaft 7 of the armature 3 through gearing 8. The stators of the selsyn devices 5 and 6 are provided with three-phase windings 9 and 10 interconnected by means of conductors 11. The rotors of said selsyn devices are provided with single phase windings 12 and 13 connected in a manner to be hereinafter described.

The selsyn system B comprises selsyn devices 14 and 15 provided with three-phase stator windings 16 and 17 which are interconnected with one another by means of conductors 18. The rotor of the device 14 is provided with a single phase winding 19 and is connected by means of a shaft 20 and gearing 21 with the control shaft 4 so that said rotor will rotate many times faster than the rotor of the device 5. The rotor of the selsyn 15 is provided with a single phase winding 22 and is coupled with the motor shaft 7. As will be seen the gearing 9 is such that the rotor of the selsyn 15 rotates many times faster than that of the selsyn 6. As will be appreciated two selsyns 6 and 15 might equivalently be geared directly with the load shaft 1 instead of through the motor shaft 7 but the arrangement illustrated is preferred in that the effect of backlash in the main gear train 2 in causing lag in response is reduced.

The armature 3 is connected with the secondary brushes of a metadyne exciter 23 which is driven by means of a motor 24 and is provided with a secondary variator winding having two oppositely wound sections 25 and 26 so that the current supplied to the armature 3 will depend upon the resultant ampere turns produced by the windings 25, 26. The driving motor is provided with a separately excited field winding 27 arranged to be constantly excited from a suitable source of constant voltage (not shown).

The motor 24 is also coupled with a high frequency generator 28, for example producing 1,000 cycles per second, this generator 28 being connected through conductors 29 with the single phase rotor windings 13 and 22 of the selsyns 6 and 15.

The rotor winding 12 of selsyn 5 is connected to input transformer 30 of a rectifying and amplifying circuit combination C; rotor winding 19 of selsyn 6, to input transformer 31 of a similar circuit combination D. The rectifying and amplifying combination C comprises a first stage consisting of a pair of hard triodes 32 and 33 the grids of which are connected, through resistor 34, in parallel with one another and so as to be energised from the secondary winding of the input transformer 30, a suitable source of grid bias voltage being included in the grid circuit as indicated at 35. The anodes of the triodes 32 and 33 are energised from the secondary windings of transformers 36 and 37, respectively, the primary windings of which are connected by the conductors 29a with the high frequency generator 28. The anode circuits of said triodes include respective resistances 38 and 39 the voltage appearing across which is applied to filter circuits comprising choke coils 40 and condensers 41 and terminal resistances 42 and 43 respectively.

The first stage of rectifying and amplifying combination D is identical, comprising, identically arranged, a pair of hard triodes 44 and 45, with grids connected through a resistor 46 biased from source 47, in parallel, energized from the secondary of transformer 31. The anodes of triodes 44 and 45 are energized from the secondaries of transformers 48 and 49, respectively, the primaries of which are connected by conductors 29a to generator 28. The anode circuits of said triodes include respective resistances 50 and 51 the voltage appearing across which is applied to filter circuits comprising choke coils 52 and condensers 53 and terminal resistances 54 and 55 respectively.

The second stage of the rectifying and amplifying combination C comprises a pair of hard tetrodes 56 and 57, the control grids of which are connected with the terminal resistances 42 and 43 respectively through condensers 58 and resistances 59 in parallel with one another, whilst a further resistance 60 is connected between each of said control grids and the cathodes of the tetrodes.

The anode circuits of the tetrodes are supplied from suitable direct current supply conductors 61, the anode circuits of the tetrodes 56 and 57 in the combination C including respectively relay coil 62, choke coil 63, resistance 64 and resistance 65, choke coil 66, relay coil 67, all in series with one another.

The second stage of the rectifying and amplifying combination D comprises a pair of hard tetrodes 68 and 69 the control grids of which are connected with the terminal resistances 54 and 55 respectively through condensers 70 and resistances 71 in parallel with one another, whilst a further resistance 72 is connected between each of said control grids and the cathodes of the tetrodes.

The anode circuits of the tetrodes 68 and 69 in the combination D include, respectively, the transformer primary winding 73, resistance 74 and resistance 75, the transformer primary winding 76.

The output from the circuit combinations C and D is finally amplified by a further stage comprising a pair of hard valves 77 and 78, which are shown as tetrodes and as will hereinafter appear, are common to both of said circuit combinations. The control grids of the valves 77 and 78 are connected through resistances 79 and 80, respectively, with movable contacts 81 and 82, respectively, which together with a third movable contact 83 are operated by the relay coils 62, 67, the contacts 81, 82, 83 being illustrated in the position which they occupy when the resultant ampere turns produced by the two coils 62, 67 is less than a predetermined value, the said coils being wound in opposition to one another. The two coils 62, 67 are associated with a common armature 84, which operates the contacts 81, 82, 83 directly. By closing a circuit (not shown) through an auxiliary operating coil 85, the coils 62, 67 also actuate, the contactor 86. In the illustrated position the contacts 81, 82 engage with respective fixed contacts 87, 88 which are connected through the respective secondary windings 89, 90 associated with the respective primary windings 73, 76 with the ends of a centre tapped resistance 91, connected across the outer ends of the resistances 74, 75. The midpoint of the resistance 91 is connected with a fixed contact 92 engaged by the movable contact 83 in the illustrated position of the latter. The contact 83 is connected through a suitable source of grid bias voltage 93 with the cathodes of the valves 77 and 78.

When the resultant ampere turns of the relay coils 62, 67 rise above the predetermined value hereinbefore referred to, the contacts 81, 82, 83 are actuated into engagement with alternative fixed contacts comprising contacts 94 and 95 co-operating respectively with the two movable contacts 81, 82 and a fixed contact 96 co-operating with the movable contact 83. The contacts 94 and 95 are connected with the ends of a centre tapped resistance 97 which is connected between the outer ends of the choke coils 63, 66. The contact 96 is connected by means of a conductor 98 with the mid-point of the centre tapped resistance 97.

The relay including the coils 62, 67 is thus operative to connect the grid circuits of the valves 77 and 78 with the circuit combinations C and D alternatively, according as the difference between the anode currents of the valves 56 and 57 in the circuit combination C is above or below a predetermined value.

The anode circuits of the valves 77 and 78 are energised from a suitable direct current supply at 99 the positive side of which is connected by means of a conductor 100 with the centre point of the winding 25, 26 whilst the ends of the latter are connected with the anodes of the valves 77 and 78 respectively, whereby the flow of anode current in the valve 77 will produce an excitation of the metadyne 23 in one direction and the flow of anode current in the valve 78 will produce an excitation on the machine 23 in the opposite direction.

In the operation of the arrangement above described the alternating current in the rotor windings 13 and 22 of the selsyns 6 and 15 will produce alternating voltages between the conductors 11 and 18 whereby the stator windings 9 and 16 of the selsyns 5 and 14 are energised so as to produce a flux which is in alignment with the flux produced by said rotor windings 13 and 22. When therefore the rotor winding 12 or 19 is disposed in a position at right angles to the rotor winding 13 or 22 as the case may be, said winding 12 or 19 will have no voltage induced in it but upon departure of either of the rotors of the selsyns 5 and 14 from these positions, the winding 12 or 19 as the case may be, will have induced in it a voltage which will vary in magnitude according to the sine of the angle of such displacement and which will be either in phase or 180° out of phase with respect to the voltage applied to the rotor windings 13 and 22, according to the direction of said displacement.

Considering first the circuit combination C, the voltage induced in the rotor winding 12 is applied to the grids of both the triodes 32 and 33. The connections of the transformer windings 36 and 37 are such that the anode circuits of these triodes are supplied with voltages which are respectively in phase and 180° out of phase with that supplied to the rotor winding 13, and consequently one or the other of said triodes will conduct the greater anode current according as the voltage induced in the rotor winding 12 is in phase or 180° out of phase with the voltage applied to the rotor winding 13. Consequently the difference between the voltages appearing across the resistances 38 and 39 will depend upon the extent of departure of the load shaft 1 from the position of the control shaft 4 and the greater voltage will appear across one or the other of said resistances according to the direction of said displacement.

The voltage appearing across each of the resistances 38 and 39 will be of a pulsating unidirectional nature. This pulsating voltage is applied to the terminal resistance 42 or 43 as the case may be after being smoothed by the choke coils 40 and condensers 41. The voltage appearing across each of the resistances 42 and 43 is applied to the control grid of the hard tetrode 56 or 57 as the case may be, after the alternating components due to change of said voltage have been advanced in phase due to the combination comprising the condenser 58 and resistances 59 and 60.

Since the anode currents of the valves 56 and 57 are proportional to the voltages applied to the grids thereof, the difference between said anode currents will be proportional to the displacement. When the displacement is changing, namely, as the load shaft moves into its position of alignment with the control shaft, there will be produced across each choke coil 63, 66 a voltage which is proportional to the rate of change of the anode current of the associated valve 56 or 57. The sum of the voltages appearing across the two coils 63, 66 in series with one another will be proportional to the rate of change of the voltage applied to the triodes 32 and 33, and therefore to the rate of change of the displacement. There is thus applied to the relay contacts 94 and 95 a voltage which contains a component dependent upon the relative velocity of the load with respect to the control shaft in addition to a component, depending upon the displacement, introduced by the voltage appearing across the resistances 64, 65.

It will be seen that the anode current in the hard tetrodes 56 and 57 of the circuit combination C depend upon the extent of the misalignment and until the shaft 1 has been brought into approximate alignment with the shaft 4, the relay coils will produce sufficient ampere turns to actuate the moving contacts 81, 82, 83 to their positions in engagement with the fixed contacts 94, 95 and 96. Consequently, the voltages produced by the circuit combination C are applied to the grids of the valves 77 and 78. Since the cathodes of these valves are connected to the mid-point of the resistance 97 the grids will be operated at opposite polarities and consequently the condition of one or the other of said valves will predominate according as the sum of the displacement and relative velocity components is in one sense or the other. The relative velocity or rate of change of displacement component is arranged to act in such sense as always to oppose the velocity of movement of the load relative to the control shaft whereby oscillation of the latter about the position of alignment or zero displacement is damped.

When the load device has been moved into approximate alignment the anode currents of the valves 56 and 57 will no longer be sufficient to maintain the relay in its actuated position so that the movable contacts of said relay return to the illustrated position, whereby the grid voltages of the valves 77 and 78 are placed under the control of the circuit combination D. Under these conditions similar operation to that above described is obtained but instead of the excitation of the exciter 23 being dependent upon the selsyn system A said excitation is controlled by the selsyn system B which is more sensitive to small displacements due to the gearing 8 and 21. In the circuit combination D, instead of the voltage corresponding to the relative velocity of the load and control shafts being obtained by a choke coil as in the circuit combination C, said voltage is provided by the secondary windings 89, 90 of the transformers associated with the anode circuits of the valves 68 and 69.

As will be appreciated the inductance of the relay coils 62, 67 may also be employed for differentiating the displacement signal obtained from the selsyn rotor winding 12, thereby to introduce the relative velocity component, either alone or in conjunction with choke coils such as 63, 66 shown in the drawing.

Preferably the several valves employed in the circuit combinations C and D and the valves 77 and 78 are biased to the mid-points of their anode current grid voltage characteristics. In such case within each pair of triodes 32, 33 and 44, 45 both triodes may conduct at the same time as one another. Similarly within each pair of tetrodes 56, 57, 68, 69 and 77, 78 both may conduct at the same time as one another. The anode currents in the two valves 77 and 78 result, as above described, in a tendency to cause the motor 3 to rotate in opposite directions respectively, the net turning effect obtained on the motor depending on the algebraic sum of the two anode currents. As will be understood the particular one of the valves 77 and 78 which conducts the greater current at any time will not necessarily be that corresponding with the valve 56, 68 or 57, 69 which conducts the greater anode current since that one of the valves 77 and 78 which conducts the greater anode current will be that to which the algebraic sum of the displacement voltage obtained across the resistors 64, 65 or 74, 75 and the relative velocity voltages obtained across the two chokes 63, 66 or the transformer secondary windings 89, 90, as the case may be, is the greater in the positive sense.

Although, as above stated, the several valves are preferably biased to the mid-point of their characteristics, said valves may alternatively be biased so that in the absence of an initial signal voltage no anode current flows, in which case at any given time the voltage obtained from the selsyn rotor winding 12 or 19, as the case may be, will cause current to flow in the anode circuit of one only of the valves within each pair 32, 33, 44, 45, 56, 57 and 68, 69.

The several resistances 34, 46 and 79, 80 serve to limit the conduction of the associated valves when the voltage derived from the selsyn systems exceed the bias voltages applied to said valves.

As above described the system according to the invention introduces into the torque of the motor 3 a component which depends upon the rate of change of displacement or the relative velocity of the shafts 1 and 4. By this means excessive overshoot and the possibility of maintaining hunting may be substantially completely eliminated, the relative velocity component being made relatively large and sufficient to ensure that any relative movement of the load within the range of proportional response of the valves is completely deadbeat and any oscillation is thereby suppressed.

When the load is moving into alignment from a large displacement it is required that the movement should be retarded well before the point of alignment or zero displacement is reached in order that the amount of over-shooting and the mechanical stress in the gearing and other parts when the motion is arrested shall be reduced. This effect is obtained by arranging that the hard valves 32, 33, 44, 45, 56, 57 and 68, 69 of the circuit combinations C and D are not saturated until a relatively large angle of displacement exists, for example about 30°, between the two selsyns 5 and 6 or 14 and 15 as the case may be. For displacements within this range the voltage applied to the grids of the valves 77 and 78 depends on the combined displacement and relative velocity effects. If the load is moving towards alignment these effects are opposite in sign and the output, that is to say the torque of the motor 3, is proportional to the difference of said components. It is arranged that the full output from the valves 77 and 78 is obtained for a small value of said difference. Consequently if the load is approaching alignment at a given velocity the displacement component would first predominate and full torque would be applied towards alignment. As alignment is approached the point is reached at which the velocity component exceeds the displacement component. At this point, which occurs earlier according as the velocity of approach to alignment is greater, the torque of the motor is reversed and full retardation applied to the load.

The effectiveness of any follow-up control system depends very largely upon the quickness of response of the motor torque to changes of the displacement or changes of the rate of change of displacement. Thus, if, for example, the load should oscillate slightly the forces which the control system brings into operation should be directed to suppress this oscillation. If, however, there are time lags in the system by which the motor torque is made responsive to such oscillation there may be some frequency of oscillation of the load at which the correcting force lags so much that instead of opposing a forward swing it reinforces the next backward swing. This action may be cumulative so that self-maintained hunting is built up.

Lag in the control operations above indicated may arise due to the following causes Thus the smoothing circuits 40, 41 and 52, 53 will cause some lag in the alternating components of changing displacement transmitted through said smoothing circuit. With the arrangement described this lag is reduced by the employment of high frequency current for the excitation of the selsyn systems. As will be appreciated an efficient smoothing circuit cannot be arranged to have a time lag of less than about ten cycles, so that the smoothing circuit would, were the selsyns operated on a normal fifty-cycle supply, produce a time lag of about 0.2 second. By the use of the high frequency, of one thousand cycles for example, this time lag is reduced to 0.01 second.

A further means by which the lag is reduced is by the employment for the second and final stages of the amplifier arrangement of valves of the pentode type, namely the valves 56, 57, 68, 69 and 77, 78. In thse valves the output current from the anodes thereof follow changes in the grid voltages, provided the latter are small, substantially without lag in spite of inductance in the load circuits of said valves, due to the very high effective anode circuit resistance of the valves.

The use of a metadyne exciter in the motive equipment shown in Fig. 1 also provides quick response, since, as is known, quick response is an inherent feature of metadyne exciters. The phase advancing resistance-capacity combinations 58, 59, 60 and 70, 71, 72 provide a further means for reducing the lag since as above described, it advances the phase of alternating components due to change of the displacement, in the output applied to the terminal resistances 42, 43 and 54, 55 of the smoothing circuits. Said resistance-capacity combination may be adjusted to provide over-compensation and will then itself introduce a differentiating effect, which is however, limited by loss of signal and magnification of the high frequency components which are of course undesired. Furthermore the introduction of the relative velocity component itself may be regarded as compensating for a proportion of the lag of response, since the reactive voltages appearing across the chokes 63, 66 or the secondary windings 89, 90 lead by one-quarter cycle on the currents through said chokes or the currents in the primary windings 73, 76. Consequently the inclusion of this voltage in the output causes the output to tend to lead the input in time phase.

All the above sources of lag should be considerably over-compensated in order to secure a rapid suppression of the oscillation following any disturbance.

In order to limit the maximum speed of the motor 3 when approaching alignment from a large displacement, such as 90° or more measured on the low speed selsyn devices 5 and 6, a diverter resistance 101 may be connected across the motor armature, a contactor 86 being included in the connection of said resistance. The operating coil 85 of this contactor is arranged to be energised under control of additional contacts of the relay 62, 67 so that in the illustrated condition of said relay said contactor is open, that is to say, the diverter resistance is effective only during operation on the low speed selsyn system and not on the high speed selsyn system.

What we claim is:

1. A follow-up control system comprising the combination with selsyn devices coupled with the control member and the load device and arranged to produce a voltage representative of the displacement of said load device with respect to said control member and a hard valve amplifying system for amplifying said voltage with reactive means interposed between said selsyns and an output circuit of said hard valve amplifying system so as to produce in said circuit a current dependent on the rate of change of said voltage, of a metadyne machine having variator winding turns connected with said amplifying system so as to be energised by the output of the latter and having secondary brushes connected with a winding of electric motor means for driving the load device whereby the torque imparted to the load device by said motor depends on said voltage and there is added to said torque a component which is dependent on the rate of change of said voltage and therefore of the displacement and which acts in opposition to the velocity of movement of the load device relative to the control member.

2. A follow-up control system as claimed in claim 1, in which the reactive means comprises a choke coil included in an anode circuit of hard valve means by which the voltage from the selsyns is rectified and amplified.

3. A follow-up control system as claimed in claim 1, in which the reactive means consist of a transformer the primary winding of which is included in an anode circuit of hard valve means by which the voltage from the selsyns is rectified and amplified, the secondary winding of said transformer being connected in the grid circuit of a subsequent stage of hard valve amplifying means.

4. A follow-up control system as claimed in claim 1, in which the armature of the electric motor for driving the load device is connected in circuit with the armature of the metadyne machine, and a separately excited field winding of said motor is connected or adapted to be connected with a constant voltage source.

CECIL DANNATT.
FREDERICK HAROLD BELSEY.

REFERENCES CITED

The following references are of record in the file of this patent:

UNITED STATES PATENTS

| Number | Name | Date |
|---|---|---|
| Re. 16,667 | Hewlett et al. | July 5, 1927 |
| 1,985,982 | Edwards | Jan. 1, 1935 |
| 1,988,458 | Minorsky | Jan. 22, 1935 |
| 2,008,364 | Moseley | July 16, 1935 |
| 2,233,415 | Hull | Mar. 4, 1941 |
| 2,311,462 | Neal | Feb. 16, 1943 |

FOREIGN PATENTS

| Number | Country | Date |
|---|---|---|
| 489,271 | Great Britain | July 22, 1938 |

OTHER REFERENCES

Differentiating and Integrating Circuits, "Electronics," November 1944, pages 138–142 (by James G. Clarke).